United States Patent Office 3,485,600
Patented Dec. 23, 1969

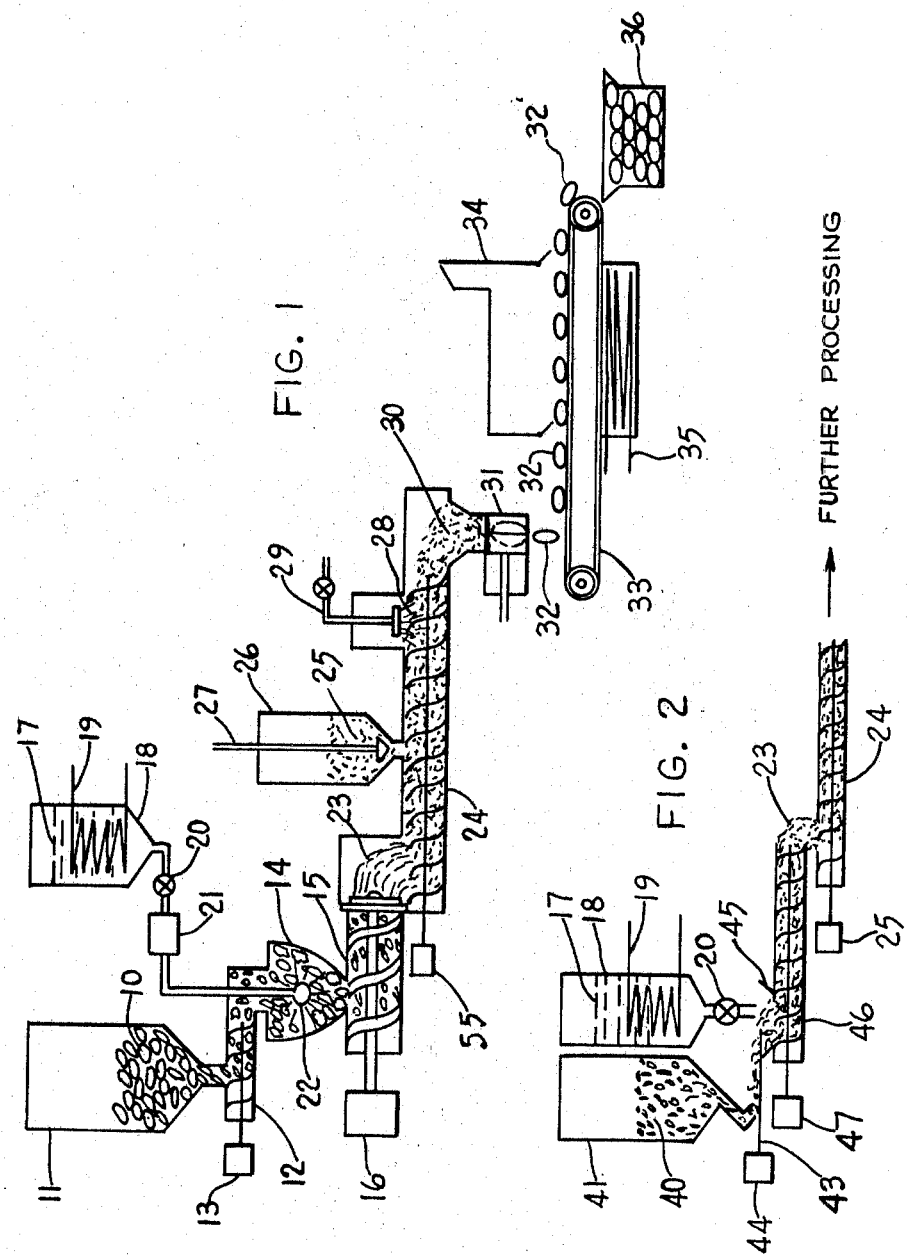

3,485,600
MANUFACTURE OF DUST-PROOF CHARCOAL ADSORBENT FINES AND BRIQUETTES MADE THEREFROM
Louie H. Robertson, 1259 Waverly Place, Elizabeth, N.J. 07208
Filed Sept. 12, 1967, Ser. No. 667,253
Int. Cl. C10l 5/14
U.S. Cl. 44—24          2 Claims

ABSTRACT OF THE DISCLOSURE

This invention relates to the coating with wax of finely divided particles of adsorptive material, such as charcoal, and the preparation therefrom of dust-free products, such as briquettes, soil conditioners, coatings on snow for melting same, etc. One method of producing wax-coated charcoal fines, according to the present invention, involves feeding a continuous stream of lump charcoal simultaneously with a continuous stream of normally-solid molten wax into a grinder which reduces the charcoal to the desired particle size, such as aggregate particles which will pass through a No. 8 mesh screen. The fines emerging from the outlet of the grinder are essentially dust-free due to the fact that the pores and channels therein are sealed with wax which has been adsorbed while the wax was in the molten state and becomes solid as soon as their temperature falls below the wax melting point. The required proportions range from about 70% to 90%, by weight, of charcoal, to about 30% to 10% of wax.

In the preparation of briquettes from charcoal fines, the fines thus wax-coated are subsequently coated with starch and water and compressed into briquettes of desired size.

BACKGROUND OF THE INVENTION

In the prior and current art, charcoal fines, for example, are produced by pulverizing suitably-sized charcoal lumps. Such charcoal is ordinarily made by the destructive distillation of wood, and the product is brittle, abrasive and very friable. During the pulverization process for the production of the charcoal fines of desired particle size, a large amount of air-polluting dust is formed, and this not only creates a nuisance, but it also results in loss of product. Furthermore, the fines product thus made is dusty, dirty and hygroscopic, and such undesirable characteristics are carried through to the end product, the briquettes, which may be made therefrom.

Although the prior art has been directed toward the production of dustless or easily-ignitable finished briquettes, the aforesaid difficulties encountered during the manufacture of these products have been more or less completely ignored. For example, in Patent No. 2,842,431, either the lump charcoal or the finished charcoal briquettes are impregnated with wax under specified time and temperature conditions. In Patent No. 2,916,364, the briquettes are impregnated or coated with a combustion aid, such as petroleum naphtha and a metal soap, such as aluminum octoate. Also, in Patent No. 3,268,310, finished charcoal briquettes are dipped, or otherwise coated, with 2-p-dioxanone to reduce dustiness and to improve ignition. Needless to say, the prior art treatments did nothing to improve the dust pollution problem during the manufacture of the briquettes.

The coating of charcoal fines with molten wax before the addition of binder and briquetting was not pursued in the art, probably on the assumption that large lumps would be formed which would prevent or interfere with subsequent processing operations. Also, it was very likely assumed that aqueous base binders would not adequately adhere to hydrophobic coatings on charcoal fines and thus would not give a strongly enough bonded briquette for commercial use. The present invention has proved that such assumptions are incorrect.

SUMMARY OF THE INVENTION

For the purpose of illustration, the preparation of wax-coated charcoal fines, and charcoal briquettes produced therefrom, will be employed as examples. According to the preferred embodiment of the present invention, a continuous stream of charcoal lumps is fed, in measured amount, into the hopper of a suitable grinder, simultaneously with a continuous stream of a hydrocarbon wax in the molten state, also in measured amount. When the coated fines are intended for use for briquettes, the preferable proportions are about 75%, by weight, of charcoal, and about 25% of wax.

When the fines emerge from the grinder outlet, most of the pores and channels of the charcoal particles are sealed with a coating of liquid wax, and the lump-free wax-coated fines are essentially dust-free. Thereafter, they are transported by means of conventional conveyor equipment to the briquetting area where the binder coating is applied. Finally, they are pressed into briquettes and dried.

The waxes which may be used in the process of the present invention may be paraffin or microcrystalline waxes having melting points as low as about 115° F., or as high as about 180° F., the choice of wax depending upon the desired end use of the coated fines.

BRIEF DESCRIPTION OF DRAWING

The invention will be more readily understood by reference to the accompanying drawing in which a preferred embodiment is described, and in which:

FIGURE 1 depicts a side view of a schematic representation of a flow sheet wherein charcoal lumps (screenings) are converted to fines which are simultaneously coated with molten wax, and the coated fines are then converted into finished briquettes, and FIGURE 2 illustrates a similar flowsheet wherein charcoal fines are mixed with molten wax and the wax-coated fines are conveyed to further processing operations.

The same numerals refer to similar parts in the various figures.

DESCRIPTION OF PREFERRED EMBODIMENTS

Referring to the drawing, and particularly to FIG. 1, the present invention encompasses the use of lump charcoal 10 of suitable size, stored in bin 11. The charcoal lumps are fed by conveyor 12 (powered by motor 13, in a measured stream) into hopper 14 of grinder 15. The latter is powered by motor 16.

Simultaneously, molten wax 17, stored in tank 18, heated by coil 19, is fed through valve 20, and may be pumped by pump 21, in a measured stream, through nozzle 22 where the molten wax is mixed with the charcoal and ground in grinder 15.

The coated charcoal fines 23, thus produced, are fed into conveyor-mixer 24 (driven by motor 55). Thereafter, starch 25 (or other suitable binder) stored in bin 26 is fed, via metering valve 27, onto the wax-coated fines, after which a spray of water 28, from pipe 29, provides the necessary binding means (with the starch). This mixture 30 is finally fed into press 31 where the forming of the briquettes takes place under pressure.

The thus-formed briquettes 32 are deposited on conveyor 33 and passed through oven 34 heated by coil 35. The finished dried briquettes 32' are deposited in storage bin 36.

In FIG. 2, charcoal fines 40 of size, for example, small enough to pass through a No. 8 mesh screen, are stored in bin 41, from which the fines fall on vibrating feeder 43 (actuated by motor 44), which feeds the fines into hopper 45 of (paddle or ribbon type) mixer 46 (which may be heated). Molten wax 17 from heated tank 18 is fed through valve 20 onto the fines entering the mixer (driven by motor 47).

Thereafter, the coated fines 23 are fed into conveyor 24, driven by motor 25, and conveyed to the binder section, or for any other processing operation.

It is to be understood that granulated solid wax may be used, but it must be in liquefied form when it is being mixed with the fines. Also, various other apparatus or parts thereof may be heated, if desired, such as conveyor 12, hopper 14, grinder 15, conveyor 24, etc.

By coating the charcoal fines in the aforesaid manner before applying the binder, it is possible to employ only about 60%, or even less, of water during the subsequent binding operation, thereby enabling reduction in drying requirements.

It has been found further that even though the charcoal fines have been coated with the hydrophobic wax, the aqueous binder was able to adhere adequately to the wax coating, thereby providing a strongly-bonded briquette. Contrary to possible prior art expectations, no lumping problems were encountered, and drying was readily effected.

I claim:
1. A process for producing briquettes of low dusting characteristics and superior igniting qualities, comprising:
   feeding continuously a stream of adsorptive charcoal fines into a mixer or grinder,
   simultaneously feeding therein a stream of paraffin wax having a melting point within the range of 115° F. to 180° F., in the proportion of about 75%, by weight, of fines to about 25% of wax in molten state,
   mixing said charcoal and wax while said wax is still in molten state and until said fines are coated with said wax,
   thereafter, coating said wax-coated fines with a starch binder,
   pressing said binder-coated wax-coated fines into briquettes, and
   drying said briquettes.
2. A charcoal briquette of low dusting quality and of superior ignitability, comprising:
   a formed mass of charcoal fines coated with a wax having a melting point within the range of 115° F. to 180° F. and in the proportion of about 75%, by weight, of fines to about 25% of wax, and
   said wax-coated fines having a starch binder coating, which latter coating, in dried form, serves to cement said wax coated fines into a hard dense mass.

References Cited

UNITED STATES PATENTS

| | | | |
|---|---|---|---|
| 770,503 | 9/1904 | Larkin | 44—24 |
| 778,096 | 12/1904 | Barnes | 44—24 |
| 1,912,697 | 6/1933 | Fife | 44—6 |
| 2,197,792 | 4/1940 | Erickson | 44—6 X |
| 2,610,115 | 9/1952 | Lykken | 44—6 X |

DANIEL E. WYMAN, Primary Examiner

C. F. DEES, Assistant Examiner

U.S. Cl. X.R.

44—10, 15, 41